Jan. 17, 1933.  W. L. RUPNOW  1,894,426
ELEVATOR BRAKE
Filed April 22, 1931   2 Sheets-Sheet 1

Inventor
W. L. Rupnow

By W. S. McDowell
Attorney

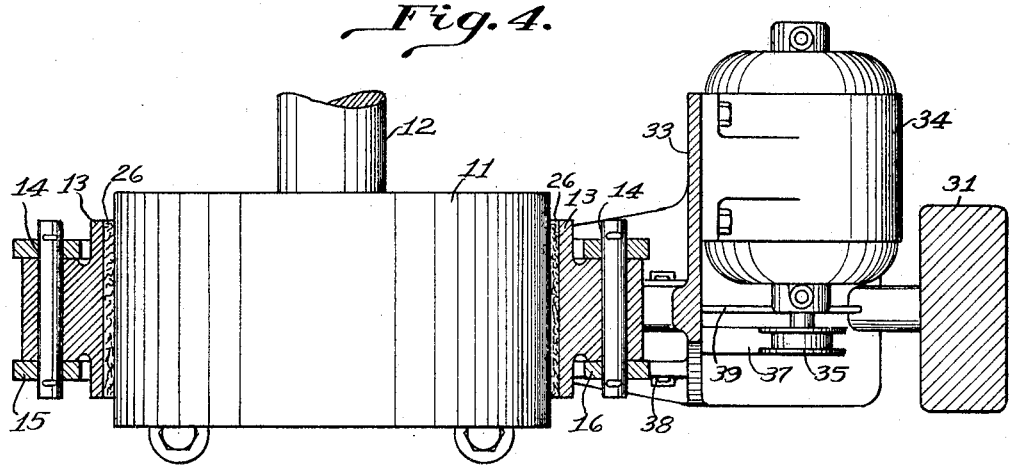
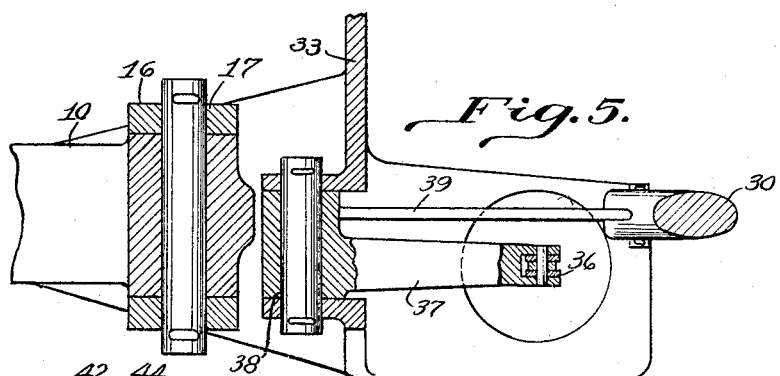
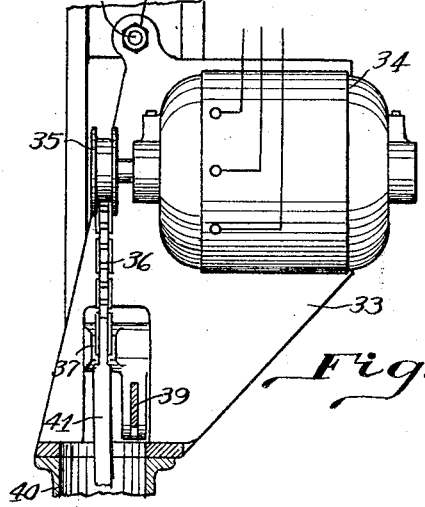

Patented Jan. 17, 1933

1,894,426

UNITED STATES PATENT OFFICE

WILLIAM L. RUPNOW, OF COLUMBUS, OHIO

ELEVATOR BRAKE

Application filed April 22, 1931. Serial No. 532,024.

This invention relates to an improved brake mechanism especially designed for use in connection with elevators, hoists and other structures wherein a motor driven drum is provided having associated therewith a pair of opposed friction shoes which are automatically released from engagement with the drum upon the energizing and starting of the motor and wherein means are provided for automatically applying the friction shoes in braking engagement with the drum when the starting motor is deenergized.

It is an outstanding object of the invention to improve upon mechanisms of this type and to provide a simple arrangement of parts for bringing the driven mechanism to a stop quickly and smoothly and without subjecting it to sudden strains or jars.

With these and other objects in view, which will appear as the description proceeds, the invention consists in the novel features of construction, combination of elements and arrangements of parts hereinafter fully described and pointed out in the appended claims.

In the accompanying drawings:

Fig. 4 is a horizontal sectional view taken through the brake mechanism on the line 4—4 of Fig. 1;

Fig. 5 is a detail horizontal sectional view of the plane disclosed by the line 5—5 of Fig. 1;

Fig. 6 is a detail vertical sectional view on the line 6—6 of Fig. 1.

Figure 1:
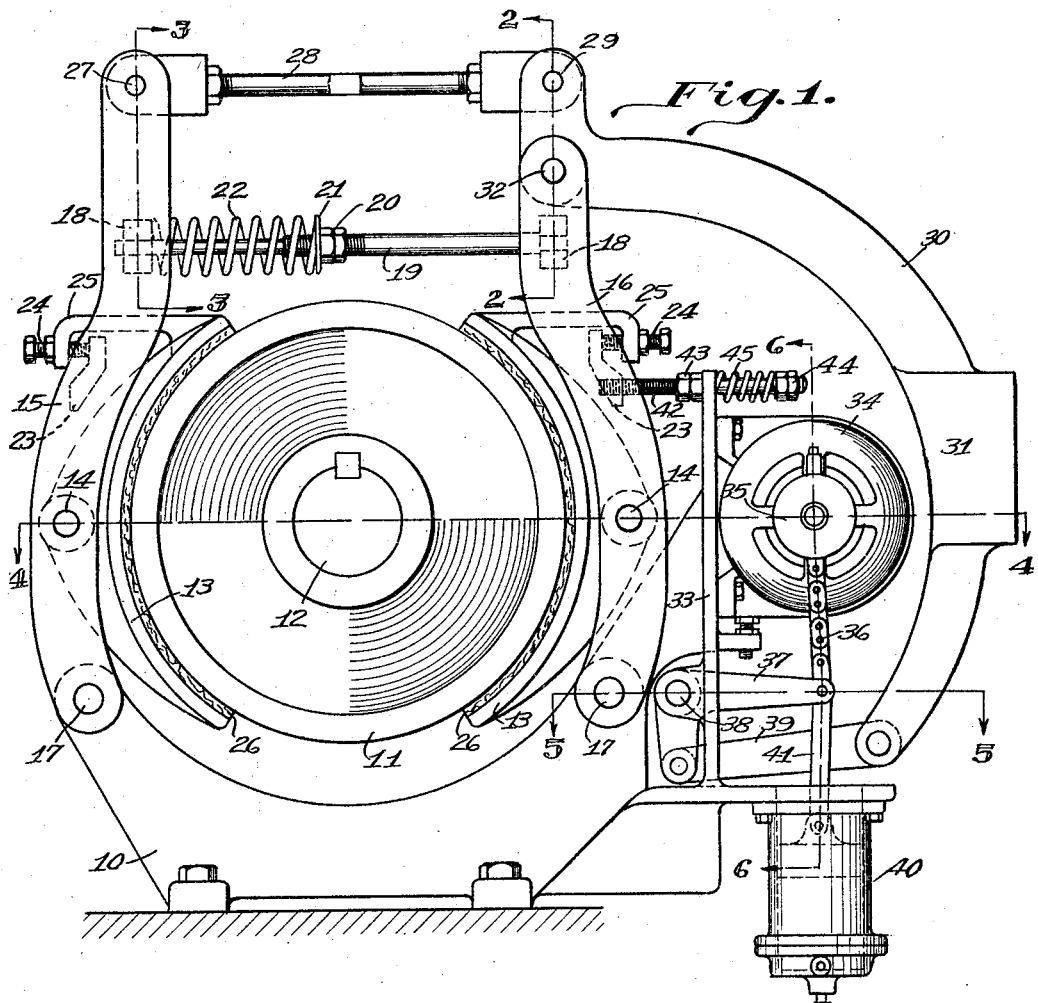
Fig. 1 is a view in elevation of the brake mechanism comprising the present invention.
Figure 2:
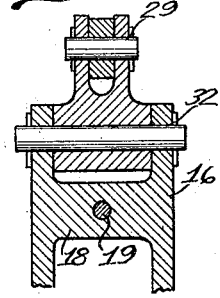
Fig. 2 is a detail vertical sectional view on the plane indicated by the line 2—2 of Fig. 1.
Figure 3:
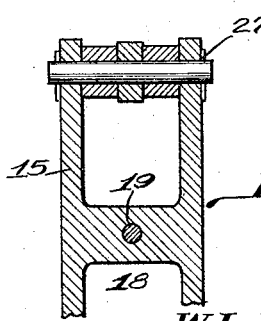
Fig. 3 is a similar view taken on the plane indicated by the line 3—3 of Fig. 1.

Referring more particularly to the drawings, the numeral 10 designates the base or other fixed portion of the machine to which the brake mechanism, comprising the present invention, is connected. A brake drum is indicated by the numeral 11 and is secured to a rotary shaft 12. In elevator construction, this brake drum is usually a part of a coupling between the motor shaft and the shaft of the remainder of the hoisting apparatus.

The frictional brake shoes are indicated at 13—13 and these brake shoes have their central metallic portions pivotally connected as at 14 with operating arms 15 and 16. The lower ends of these arms are pivotally secured as at 17 to the base 10, while the upper ends of said arms are provided with webs 18 formed with perforations which recieve the ends of a transversely extending rod 19. This rod is threaded intermediately of its ends and provided with adjusting nuts 20 and a washer 21. A coil spring 22 is positioned between the washer 21 and the web 18 carried by the arm 15, the normal tendency of said spring being to force the arms apart whereby to retract the brake shoes from frictional engagement with the perimeter of the drum 11. Also, the arms 15 and 16 are provided with transverse webs 23 which engage the inner ends of threaded adjusting screws 24, which are carried by brackets 25 integrally formed with the metallic holders of the brake shoes, whereby through the adjustment of the screws 24, the said brake shoes may be revolved about their pivotal connections with the arms 15 and 16 to bring the arcuate lined surfaces 26 of said brake shoes into proper registration with the circular faces of the drum 11.

Pivotally connected as at 27 with the extreme upper end of the arm 15 is a tie rod 28, which rod has its opposite end pivotally connected as at 29 with an arcuate weight lever 30. This lever is formed with a suitable enlarged weight producing portion 31 and the lever as a whole is pivotally carried as at 32 in connection with the upper end of the arm 16. This construction is employed in lieu of springs and other movable means for the purpose of normally serving to maintain the brake shoes in frictional engagement with the drum 11. By reason of the formation of the arcuate lever and its weighted outer extremity, its tendency is to rock around the axis 32 so as to impart a pulling force to the tie rod 28, thereby drawing the brake shoe connected with the arm 15 into contact with the drum. Likewise, since the lever has a floating pivotal mounting on the upper end of the arm 16, the reactive forces set up serve to force the brake shoe connected with the arm 16 into frictional braking engagement with the drum 11. Therefore, by this arrangement of levers and weights, a simple mechanism is provided which normally functions to hold the brake drum against rotation.

To effect the release of the drum, the base 10 includes a stationary upward wall 33 upon which is mounted a reversible "stall" motor 34. The armature shaft of this motor has secured thereto a pulley 35 to which is secured the upper portion of a chain or other flexible connection 36. The lower end of this chain is connected with a bell crank lever 37 pivotally mounted as at 38 in connection with the wall 33. The shorter arm of the lever 38 is united by means of a link 39 with the lower end of the arcuate lever 30. It will be seen that when the motor 34 is energized, and this is accomplished simultaneously with the operation of the motor used for rotating the drum 11, the pulley 35 will be partially rotated to draw the chain connection 36 thereabout. This results in rocking the lever 37 so that the weight lever 30 will be rocked about its fulcrum 32 in such manner as to impart a pushing movement to the tie rod 28, thereby oscillating the arm 15 in such a direction as to remove the frictional brake connected therewith from contact with the drum. Similarly, this motion results in oscillating the arm 16 to move the brake shoe connected therewith away from the drum. The motor 34 is preferably employed in lieu of a solenoid in that it is very positive and reliable in its operation and does not produce the noise and clatter which is set up by a solenoid, for example. Further, the motor 34 has the ability to remain energized, during the operation of the main motor, to impart a continuous pull to the flexible connection 36. A dashpot 40 is connected by a link 41 with the bell crank 37 in order to relieve the mechanism of sudden strains and jars and to render its action more uniform.

Connected with the web 23 of the arm 16 is a rod 42 which is loosely received in a guide opening formed in the upper end of the wall 33. The rod 42 is threaded intermediately of its length for the reception of adjustable stop nuts 43, while the outer end of said rod is similarly threaded for the reception of nuts 44. A coil spring 45 is arranged to surround this rod, between the nuts 44, and the wall 33. The spring 45 thus supplements the action of the spring 22 in drawing the brake shoes away from the drum 11 and the nuts 43 are used to adjustably limit the extent of this withdrawal movement on the part of the brake shoes.

In operation, when the main motor (not shown) for rotating the braking drum 11 is energized, the stall motor 34 is simultaneously energized. The rotation of the shaft of the stall motor partially winds the flexible connection 36 about its axis in order to rock the bell crank lever 37 which, in turn, through the link 39, oscillates the weighted lever about its axis 32 on the arm 16 with the result that through the tie rod connection 28, the arm 15 and likewise the arm 16 swing about their pivotal connections 17 with the base 10 to withdraw the brake shoes from contact with the brake drum, thus allowing unhindered rotation of said drum in unison with the main motor and the consequent raising and lowering of a car, hoist or other member of the elevator assembly. When the main driving motor is deenergized, the stall motor is likewise deenergized which permits the weighted lever 30 to swing by gravity in a substantially downward direction, whereby the arms 15 and 16 are oscillated, as above explained, to firmly contact the friction brakes with the drum 11 to arrest further rotation of said drum and the operation of mechanism connected therewith until the main operating motor is again energized. This construction has the advantage of being extremely quiet in operation, both positive and reliable and devoid of small complicated parts which tend readily to become out of order and require constant repair and adjustment.

What is claimed is:

1. In elevator brake mechanism, a motor driven drum, a pair of pivotally mounted arms arranged on opposite sides of said drum, brake shoes pivotally connected with said arms, said brake shoes being provided with arcuate surfaces adapted for coaction with the perimeter of said drum, a weighted lever pivotally connected with the upper end of one of said arms, a tie rod uniting the other of said arms with an offset portion of said lever whereby said weighted lever normally serves through gravity to oscillate said arms inwardly to maintain the brake shoes carried thereby in contact with said drum, spring means between said arms normally serving to force said arms apart, said spring means being normally counter-acted by the weighted lever, a stall motor, a bell crank lever, a flexible connection between the armature shaft of said stall motor and said bell crank lever, and a link connection between said bell crank lever and the lower depending portion of said weighted lever, whereby when said stall motor is energized, the said weighted lever is moved to a position against gravity for effecting the release of the brake shoes.

2. In elevator brake mechanism, a motor driven drum, a pair of pivotally mounted arms arranged on opposite sides of said drum, brake shoes pivotally connected with said arms, a weighted lever pivotally connected with the upper end of one of said arms, a tie rod uniting the other of said arms with an offset portion of said lever whereby said weighted lever normally serves through gravity to oscillate said arm inwardly to maintain the brake shoe carried thereby in contact with said drum, a stall motor, a bell crank lever, a connection between said bell crank lever and the lower depending portion of said weighted lever, a connection between the armature shaft of said motor and said bell crank lever, whereby when said stall motor is energized, the said weighted lever is moved to a position against gravity for effecting the release of the brake shoes.

3. In elevator brake mechanism, a motor driven drum, a pair of pivotally mounted arms arranged on opposite sides of said drum, brake shoes pivotally connected with said arms, a weighted lever pivotally connected with the upper end of one of said arms, a tie rod uniting the other of said arms with an offset portion of said lever whereby said weighted lever normally serves through gravity to oscillate said arm inwardly to maintain the brake shoes carried thereby in contact with said drum, a stall motor arranged in circuit with the drum driving motor, and operable means connecting said stall motor and said weighted lever whereby regardless of the direction of rotation of said stall motor, governed by the rotation of said drum driving motor, said weighted lever is moved to a position against gravity to effect the release of the brake shoes.

4. In elevator brake mechanism, a motor driven drum, a pair of pivotally mounted arms arranged on opposite sides of said drum, brake shoes engaging said drum and pivotally connected with said arms, a weighted lever pivotally connected with the upper end of said arm and functioning through gravity to oscillate said arm inwardly to maintain the brake shoes carried thereby in contact with said drum, a stall motor arranged in circuit with the drum driving motor, an operating connection between the armature shaft of said motor and the lower end of said weighted lever, whereby regardless of the direction of rotation of said stall motor, governed by the rotation of said drum driving motor, said stall motor serves to hold the weighted lever against gravity for effecting the release of said brake shoes.

In testimony whereof I affix my signature.

WILLIAM L. RUPNOW.